United States Patent
Ko

[11] Patent Number: 6,050,806
[45] Date of Patent: Apr. 18, 2000

[54] INJECTION NOZZLE WITH CUSHION RING

[75] Inventor: Jae-Sik Ko, Ahnsan, Rep. of Korea

[73] Assignee: Yudo Co., Ltd., Seoul, Rep. of Korea

[21] Appl. No.: 09/174,313

[22] Filed: Oct. 19, 1998

[30] Foreign Application Priority Data

Feb. 26, 1998 [KR] Rep. of Korea .......................... 98-2635

[51] Int. Cl.[7] .................................................. B29C 45/20
[52] U.S. Cl. .................... 425/549; 264/328.15; 425/564; 425/566
[58] Field of Search .................................... 425/549, 564, 425/566; 264/328.15

[56] References Cited

U.S. PATENT DOCUMENTS

| 4,010,903 | 3/1977 | Sakuri et al. ........................... 425/549 |
| 5,554,395 | 9/1996 | Hume et al. ....................... 264/328.15 |

*Primary Examiner*—Tim Heitbrink
*Attorney, Agent, or Firm*—McDermott, Will & Emery

[57] ABSTRACT

An injection nozzle with a cushion ring is disclosed. In the injection nozzle used for injecting pressurized and melted resin into the cavity of a mold during an injection molding process, an axial hole is formed at the lower end of a nozzle body with an annular step being formed at the upper end of the axial hole. A nozzle tip is axially received in the axial hole and is stepped at its external surface, thus forming a stop shoulder at the external surface. The nozzle tip is brought into contact with the core of the cavity at its lower end during an injection molding process. A cushion ring, made of a stainless steel and having an O-ring shape, is interposed between the annular step of the axial hole and the top end of the nozzle tip. The stop shoulder of the nozzle tip is stopped by a stop ring, thus retaining the nozzle tip in the axial hole of the nozzle body.

1 Claim, 2 Drawing Sheets

6,050,806

1

INJECTION NOZZLE WITH CUSHION RING

BACKGROUND OF THE INVENTION

1. Field of the Invention

The present invention relates, in general, to an injection nozzle of an injection molding machine used for injecting pressurized and melted resin into the cavity of a mold and, more particularly, to an injection nozzle having a nozzle tip at its lower end and provided with a cushion ring at a position between a nozzle body and the nozzle tip, said cushion ring not only relieving pressure acting on the nozzle tip when the nozzle thermally expands by a heater during an injection of melted resin into the cavity of a mold and thereby preventing the core of the cavity from breakage, but also biasing the nozzle tip onto the core, thus preventing the melted resin from leakage during an injection molding process.

2. Description of the Prior Art

As well known to those skilled in the art, when forming a synthetic resin product through an injection molding process, melted resin under high pressure is injected from an injection cylinder into the cavity of a mold through the injection nozzle of a manifold. In order to allow the lower end of the injection nozzle to be smoothly inserted into the core of the cavity of the mold prior to injecting the melted resin into said cavity, an insert hole, having a diameter larger than the outer diameter of the lower end of the injection nozzle, is formed on the core of the cavity. Such an insert hole forms a gap at a position around the lower end of the injection nozzle. When the melted resin is injected into the cavity, the resin is introduced into the gap around the lower end of the nozzle. The resin in the gap is continuously heated by the heater, provided around the injection nozzle, resulting in that said resin may be plastically deformed, discolored or changed in its physical characteristics. Said resin is, thereafter, introduced into the cavity, thus deteriorating the quality of the product. Such a problem is prominent particularly when producing white products through an injection molding process. It is thus necessary to overcome such a problem. When a product, having different colors, is produced through an injection molding process, the resin, introduced from the gap into the cavity, is mixed with the resin directly injected from the nozzle into the cavity, thus reducing the quality of the products. In an effort to overcome the above problems, the injection nozzle is positioned relative to the cavity of a mold in a way such that the lower end of the nozzle is brought into pressure contact with the core of the cavity, thus preventing leakage of the resin from the junction between the nozzle and the core. However, the injection nozzle is heated by the heater and thermally expands, thus biasing the core of the cavity and causing a crack in the core. In such a case, the mold has to be changed with a new one and this forces the user to pay money for the molds and increases production cost of the injection molded products.

SUMMARY OF THE INVENTION

Accordingly, the present invention has been made keeping in mind the above problems occurring in the prior art, and an object of the present invention is to provide an injection nozzle, which has a nozzle tip at its lower end and is provided with a cushion ring at a position between the nozzle body and the tip, said cushion ring not only relieving pressure acting on the nozzle tip when the nozzle thermally expands by a heater during an injection of melted resin into the cavity of a mold and thereby preventing the core of the cavity from breakage, but also biasing the nozzle tip onto the core, thus preventing the melted resin from leakage during an injection molding process.

In order to accomplish the above object, the present invention provides an injection nozzle used for injecting pressurized and melted resin into the cavity of a mold during an injection molding process, comprising: a nozzle body having an axial hole at its lower end with an annular step being formed at the upper end of the axial hole; a nozzle tip axially received in the axial hole of the nozzle body and stepped at its external surface, thus forming a stop shoulder at the external surface, said nozzle tip being brought into contact with the core of the cavity at its lower end during an injection molding process; a cushion ring interposed between the annular step of the axial hole and the top end of the nozzle tip, said cushion ring being made of a stainless steel and having an O-ring shape; and a stop ring stopping the stop shoulder of the nozzle tip, thus retaining the nozzle tip in the axial hole of the nozzle body.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
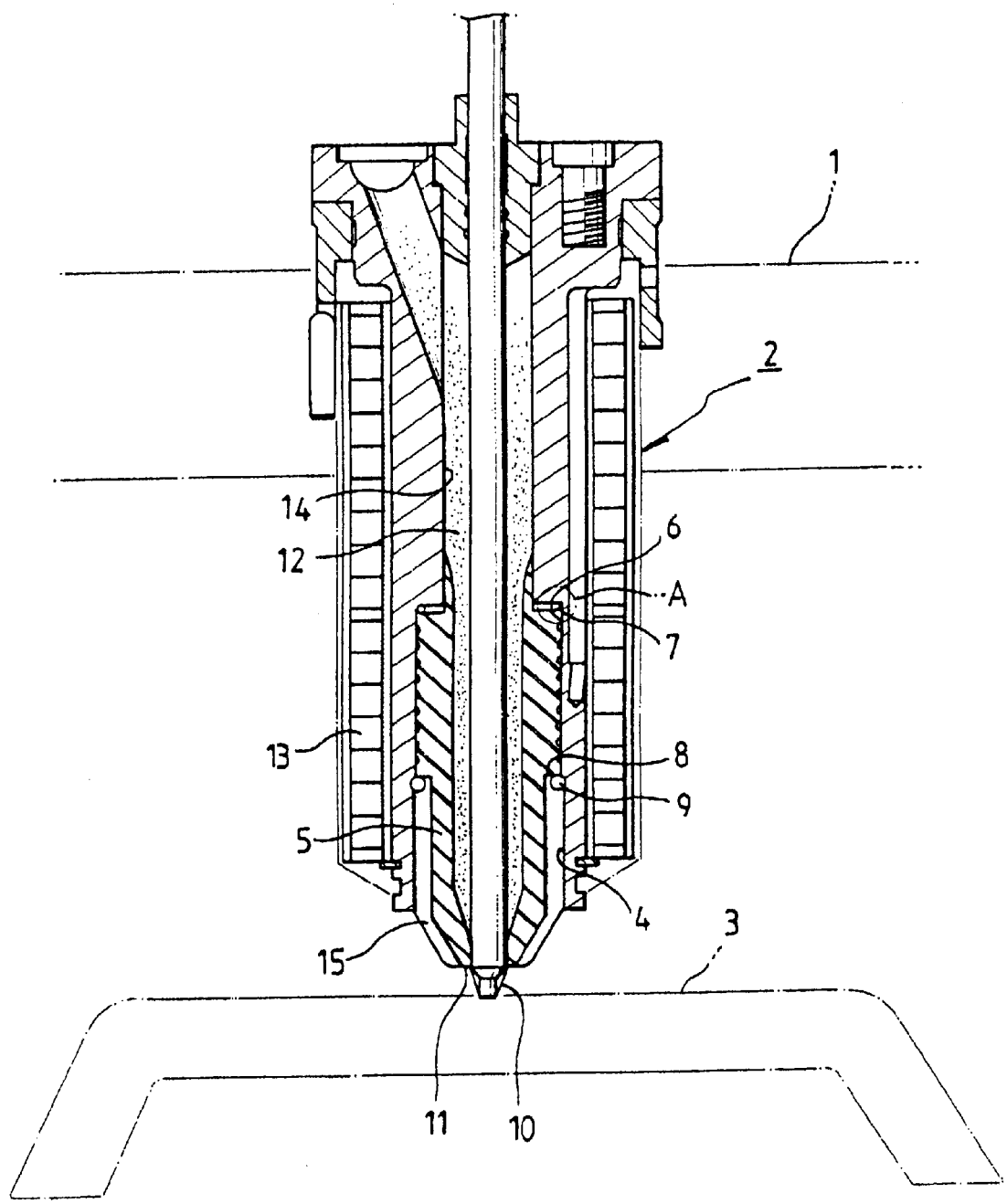
FIG. 1 is a sectional view of an injection nozzle in accordance with the preferred embodiment of the present invention.
Figure 2:
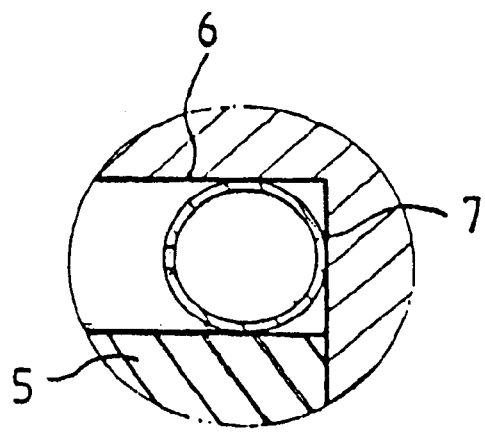
FIG. 2 is a sectional view of the portion "A" of FIG. 1, showing the position of a cushion ring of this invention.
Figure 3:
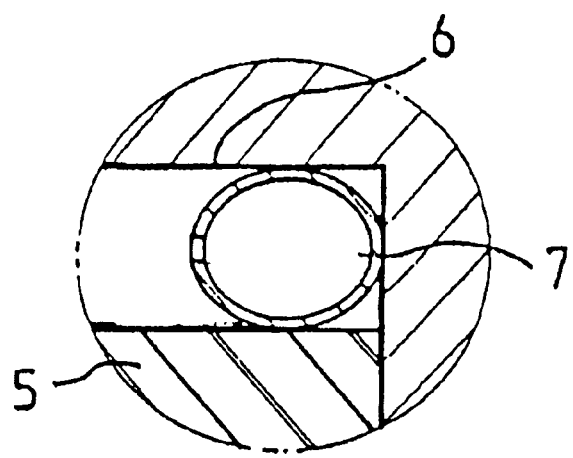
FIG. 3 is a sectional view showing the operational effect of the cushion ring of FIG. 2.

FIG. 1 is a sectional view of an injection nozzle according to the preferred embodiment of this invention. FIG. 2 is a sectional view of the portion "A" of FIG. 1, showing the position of a cushion ring of this invention. FIG. 3 is a sectional view showing the operational effect of the above cushion ring.

As shown in FIG. 1, in order to inject melted resin 12 under pressure into the cavity 3 of a mold 1 using the injection nozzle 2 of this invention, the nozzle 2 is positioned relative to the cavity 3 in a way such that the lower end of a nozzle tip 5 is brought into contact with the core 10 of the cavity 3.

An axial hole 4 is axially formed at the lower end of a nozzle body with an annular step 6 being formed at the upper end of the hole 4. A nozzle tip 5, having an exterior stop shoulder 8 at its middle portion, is axially received in the above hole 4 with a cushion ring 7 being interposed between the step 6 of the hole 4 and the top end of the nozzle tip 5. The cushion ring 7 is made of a stainless steel and has an O-ring shape. In order to allow the nozzle tip 5 to be retained in the hole 4, the stop shoulder 8 of the nozzle tip 5 is stopped by a stop ring 9 fitted in the hole 4. During an injection molding process, the lower end 11 of the nozzle tip 5 is positioned to be brought into contact with the core 10 of the cavity 3.

In the drawings, the reference numeral 13 denotes a heater provided around the nozzle body, the numeral 14 denotes a resin hole of the injection nozzle 2 through which the melted resin passes prior to being injected into the cavity 3. The reference numeral 15 denotes an opening formed around the lower end 11 of the nozzle tip 5.

The operational effect of the above injection nozzle 2 will be described hereinbelow.

The nozzle tip 5 is assembled with the nozzle body into an injection nozzle 2 as follows. Both the cushion ring 7 and the nozzle tip 5 are inserted into the hole 4 of the nozzle body in a way such that the ring 7 is closely interposed between the step 6 of the hole 4 and the top end of the nozzle tip 5. Thereafter, the stop shoulder 8 of the nozzle tip 5 is stopped by the stop ring 9, thus retaining the nozzle tip 5 in said hole 4. When the injection nozzle 2 is used in an injection molding process, the nozzle 2 is positioned relative to the cavity 3 of a mold 1 with the lower end 11 of the nozzle tip 5 coming into close contact with the core 10 of the cavity 3. The above core 10 forms a passage allowing melted resin 12 to pass through into the cavity 3 during an injection molding process. When the injection nozzle 2 is completely positioned relative to the cavity 3, melted resin 12 is injected into the cavity 3 at a high pressure by an injection cylinder (not shown). In such a case, the pressurized and melted resin 12 passes through the resin hole 14 of the injection nozzle 2 prior to reaching the interior of the cavity 3.

When the lower end 11 of the nozzle tip 5 comes into contact with the core 10 of the cavity 3 as described above, the heater 13 is not started. In such a case, the lower end 11 of the nozzle tip 5 comes into close contact with the core 10 without forming any gap between the end 11 and the core 10. Therefore, the melted resin 12 is not introduced into the opening 15, formed around the lower end 11 of the nozzle tip 5, during an injection molding process.

When the resin 12 passes through the resin hole 14 of the injection nozzle 2 so as to fill the cavity 3, the resin 12 may be hardened in the resin hole 14. In order to prevent the resin 14 from being hardened in the resin hole 14, the heater 13 starts to heat the injection nozzle 2. However, when the injection nozzle 2 is heated for a lengthy period of time, the nozzle body, made of a metal, thermally expands. Due to such a thermal expansion of the nozzle body, the nozzle tip 5 is biased downwardly onto the core 10 of the cavity 3. When the nozzle tip 5 is biased downwardly due to the thermal expansion of the nozzle body as described above, the lower end 11 of the nozzle tip 5 is reacted by the core 10 of the cavity 3. In such a case, both the biasing force of the thermally expanded nozzle body and the reaction force acting on the nozzle tip 5 are applied to the cushion ring 7 in opposite directions at the same time. Since the cushion ring 7 is made of a material having a hardness of lower than that of either the nozzle body or the nozzle tip 5, the ring 7 is elastically deformed by the biasing force and the reaction force as shown in FIG. 3. The cushion ring 7 thus effectively intercepts the thermal expansion force of the nozzle body before said force is transmitted to the nozzle tip 5. The core 10 of the cavity 3 is thus prevented from being exceedingly biased or deformed.

During an injection molding process, the injection nozzle 2 of this invention reliably allows the lower end 11 of the nozzle tip 5 to come into close contact with the core 10 of the cavity 3 without forming any gap between the tip 5 and the core 10 even when the nozzle 2 injects the pressurized and melted resin 12 into the cavity 3 for a lengthy period of time. Therefore, the melted resin 12 is not introduced into the opening 15, formed around the lower end 11 of the nozzle tip 5, during an injection molding process. Even when the melted resin 12 is introduced into the gap formed between the hole 4 and the nozzle tip 5 of the injection nozzle 2, said resin 12 is not introduced into the opening 15 since the cushion ring 7 closes the gap communicating with the opening 15. In addition, the injection nozzle 2 of this invention does not discolor the resin 12 or change the physical characteristics of the resin 12 so that the nozzle 2 is effectively used for producing a product, having different colors, through an injection molding process.

As described above, the present invention provides an injection nozzle used in an injection molding process. The injection nozzle has a nozzle tip in an axial hole formed at the lower end of a nozzle body. A cushion ring is interposed between the annular step formed at the upper end of said axial hole and the top end of the nozzle tip. The cushion ring is for relieving pressure acting on the nozzle tip when the nozzle body thermally expands by a heater during an injection of melted resin. The cushion ring thus prevents the core of a mold's cavity from breakage. The cushion ring also biases the nozzle tip onto the core, thus allowing the lower end of the nozzle tip to come into contact with the core of the cavity during an injection molding process. This prevents melted resin from leakage during the injection molding process. The injection nozzle of this invention is thus more effectively used in an injection molding process of producing products individually having different colors.

Although the preferred embodiments of the present invention have been disclosed for illustrative purposes, those skilled in the art will appreciate that various modifications, additions and substitutions are possible, without departing from the scope and spirit of the invention as disclosed in the accompanying claim.

What is claimed is:

1. An injection nozzle used for injecting pressurized and melted resin into a cavity of a mold during an injection molding process, comprising:

a nozzle body having an axial hole at its lower end with an annular step being formed at an upper end of said axial hole;

a nozzle tip axially received in said axial hole of the nozzle body and stepped at its external surface, thus forming a stop shoulder at said external surface, said nozzle tip being brought into contact with a core of said cavity at its lower end during the injection molding process;

a cushion ring interposed between said annular step of the axial hole and a top end of said nozzle tip, said cushion ring being made of a stainless steel and having an O-ring shape; and a stop ring stopping the stop shoulder of the nozzle tip, thus retaining said nozzle tip in the axial hole of the nozzle body.

* * * * *